(12) United States Patent
Kruglick (10) Patent No.: US 8,635,675 B2
(45) Date of Patent: Jan. 21, 2014

(54) INTEGRATED CIRCUITS AS A SERVICE

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/521,440

(22) PCT Filed: Dec. 2, 2011

(86) PCT No.: PCT/US2011/063059
§ 371 (c)(1),
(2), (4) Date: Jul. 10, 2012

(87) PCT Pub. No.: WO2013/081629
PCT Pub. Date: Jun. 6, 2013

(65) Prior Publication Data
US 2013/0145431 A1 Jun. 6, 2013

(51) Int. Cl.
*H04L 29/06* (2006.01)
*G06F 21/62* (2013.01)
(52) U.S. Cl.
CPC ............ *H04L 63/08* (2013.01); *G06F 21/6218* (2013.01); *H04L 63/102* (2013.01)
USPC ............................................................ 726/4
(58) Field of Classification Search
USPC .......................................................... 726/4
See application file for complete search history.

(56) References Cited

U.S. PATENT DOCUMENTS 7,150,011 B2 * 12/2006 Ha et al. ......................... 717/148
7,640,528 B1 * 12/2009 Baeckler ....................... 716/100
7,991,909 B1 * 8/2011 Schumacher et al. ......... 709/237
2001/0037458 A1 * 11/2001 Kean .............................. 713/193
2006/0265603 A1 * 11/2006 McLean et al. ............... 713/189
2007/0172041 A1 * 7/2007 Boccon-Gibod et al. .. 379/142.1
2008/0189350 A1   8/2008 Vasa et al.
2008/0250406 A1 * 10/2008 Carpenter et al. ................ 718/1
2008/0270805 A1 * 10/2008 Kean ............................. 713/189
2009/0083144 A1   3/2009 Menditto et al.
2009/0187756 A1 * 7/2009 Nollet et al. ................... 713/100
2009/0259612 A1 * 10/2009 Hanson ........................... 706/47
2009/0328170 A1  12/2009 Williams et al.

(Continued)

OTHER PUBLICATIONS

Madhavapeddy, A.; Singh, S., "Reconfigurable Data Processing for Clouds," Field-Programmable Custom Computing Machines (FCCM), May 1-3, 2011, IEEE 19th Annual International Symposium, pp. 141,145.*

(Continued)

*Primary Examiner* — Luu Pham
*Assistant Examiner* — Nelson Giddins
(74) *Attorney, Agent, or Firm* — Turk IP Law, LLC (57) ABSTRACT

Technologies are generally described for provisioning and managing access to FPGAs as a service. In some examples, a system for allowing provisioning management for shared FPGA use and access control to enable a user's processes to access their custom programmed FPGA may accept user packages for compilation to an FPGA in communication with datacenter servers. The user packages may be imaged to the FPGA with an added management payload, and a driver and user key may be employed to allow selective access to the FPGA as a service for datacenter virtual machines. Together these elements allow a datacenter to provision rentable integrated circuits as a service (ICaaS). Additional services such as billing tracking, provision management, and access control may be provided to users allowing them to realize lower cost while the datacenter realizes greater return.

18 Claims, 6 Drawing Sheets

(56) References Cited

U.S. PATENT DOCUMENTS

| | | | | |
|---|---|---|---|---|
| 2010/0266121 | A1* | 10/2010 | Yamazaki et al. | 380/28 |
| 2011/0072293 | A1* | 3/2011 | Mazzaferri et al. | 713/340 |
| 2011/0153861 | A1* | 6/2011 | Chauhan | 709/232 |
| 2011/0210829 | A1* | 9/2011 | Kean | 340/10.42 |
| 2011/0246627 | A1* | 10/2011 | Kern | 709/220 |
| 2011/0246992 | A1* | 10/2011 | Kern | 718/100 |
| 2011/0258621 | A1* | 10/2011 | Kern | 718/1 |
| 2011/0296410 | A1* | 12/2011 | Lo et al. | 718/1 |
| 2012/0065956 | A1* | 3/2012 | Irturk et al. | 703/21 |
| 2012/0096455 | A1* | 4/2012 | Katsumata et al. | 717/177 |
| 2012/0290863 | A1* | 11/2012 | Archer et al. | 713/320 |
| 2013/0019011 | A1* | 1/2013 | Breitgand et al. | 709/224 |
| 2013/0046722 | A1* | 2/2013 | Hanson | 706/47 |

OTHER PUBLICATIONS

Mondol, J.-A.M., "Cloud security solutions using FPGA," Aug. 23-26, 2011, Communications, Computers and Signal Processing (PacRim), IEEE Pacific Rim Conference, pp. 747,752.*

"Field-programmable gate array" http://en.wikipedia.org/wiki/Field-programmable_gate_array. Accessed Nov. 14, 2011.

Nguyen, "JP Morgan supercomputer offers risk analysis in near real-time". Computerworld UK. Jul. 11, 2011. http://www.computerworlduk.com/news/it-business/3290494/jp-morgan-supercomputer-offers-risk-analysis- in-near-real-time/.

Datta et al., Software Infrastructure for a Remote FPGA Laboratory, in 15th Annual IEEE Symposium on Field-Programmable Custom Computing Machines (FCCM 2007) (presented at the 15th Annual IEEE Symposium on Field-Programmable Custom Computing Machines (FCCM 2007), Napa, CA, USA, 2007), 343-344, http://ieeexplore.ieee.org/lpdocs/epic03/wrapper.htm?arnumber=4297290.

Flynn et al., "Finding Speedup in Parallel Processors," ispdc, pp. 3-7, 2008 International Symposium on Parallel and Distributed Computing, 2008 http://www.computer.org/portal/web/csdl/doi/10.1109/ISPDC.2008.64.

"ACTIV MPU Deployed by Jefferies to Enhance Performanc Capacity" ACTIV Financial. Jun. 15, 2010. Marketwire Digital Media Online.

Richards et al., "Technology in Banking—A Problem in Scale and Complexity" (May 11, 2011) JP Morgan Chase and Co. Stanford University. http://www.stanford.edu/class/ee380/Abstracts/110511-slides.pdf.

International Search Report and Written Opinion PCT/US11/63059 filed Dec. 2, 2011, mailed May 17, 2012.

* cited by examiner

INTEGRATED CIRCUITS AS A SERVICE

BACKGROUND

Unless otherwise indicated herein, the materials described in this section are not prior art to the claims in this application and are not admitted to be prior art by inclusion in this section.

Field Programmable Gate Arrays (FPGAs) are large programmable arrays of gates that can be repeatedly reconfigured at hardware level to provide application specific hardware. FPGA systems can offer an effective, cheaper-cost-per-throughput solution for those performing large data functions like database sorts or business analytics which are increasingly common, especially in datacenter operations. For example, risk management computations for financial institutions, insurance companies, and other business entities may consume large amounts of computing resources, which may be reduced by employing FPGAs instead of generic computing systems.

While computational costs may be reduced and efficiency increased through the use of FPGAs, initial investment may be prohibitively large for smaller operations. Even for larger organizations, an FPGA based system may not be utilized full time reducing the overall efficiency and investment value. A similar example involves datacenter operations. A comprehensive datacenter with data stores, servers, firewalls, and other specialized equipment may provide much needed data storage, accessibility, and security. However, the number of potential users whose needs can justify setting up a large scale datacenter is rather limited. And, even such potential users may not utilize capabilities of a large scale datacenter fully all the time.

Thus, while efficiency and cost-effectiveness of FPGA based technologies in large scale data operations are appreciated, their effectiveness for a wide range of users may be limited due to initial investment and operational maintenance considerations.

SUMMARY

The present disclosure generally describes technologies for enabling selective access to a programmable integrated circuit such as a Field Programmable Gate Array (FPGA) as a service for datacenter virtual machines. According to some examples, a method for providing a programmable integrated circuit (IC) as a service, may include receiving a programmable integrated circuit design package at a data center; adding a management payload to the IC design package; creating a user key associated with the IC design package, wherein the user key matches the management payload; and providing selective access to the programmable IC through one or more virtual machines employing the user key.

According to other examples, a data center providing a programmable integrated circuit (IC) as a service may include a management server, which may receive a programmable integrated circuit design package at a data center; add a management payload to the IC design package; create a user key associated with the IC design package, wherein the user key matches the management payload; and provide selective access to the programmable IC through one or more virtual machines employing the user key.

According to further examples, a computer-readable storage medium may include instructions stored thereon for providing a programmable integrated circuit (IC) as a service. The instructions may include receiving a programmable integrated circuit design package at a data center; adding a management payload to the IC design package; creating a user key associated with the IC design package, wherein the user key matches the management payload; and providing selective access to the programmable IC through one or more virtual machines employing the user key.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to provisioning and managing access to FPGAs or other programmable circuits as a service.

Briefly stated, a system for allowing provisioning management for shared FPGA use and access control to enable a user's processes to access their custom programmed FPGA may accept user packages for compilation to an FPGA in communication with datacenter servers. The user packages may be imaged to the FPGA with an added management payload, and a driver and user key may be employed to allow selective access to the FPGA as a service for datacenter virtual machines. Together these elements allow a datacenter to provision rentable integrated circuits as a service (ICaaS). Additional services such as billing tracking, provision management, and access control may be provided to users allowing them to realize lower cost while the datacenter realizes greater return.

Figure 1:
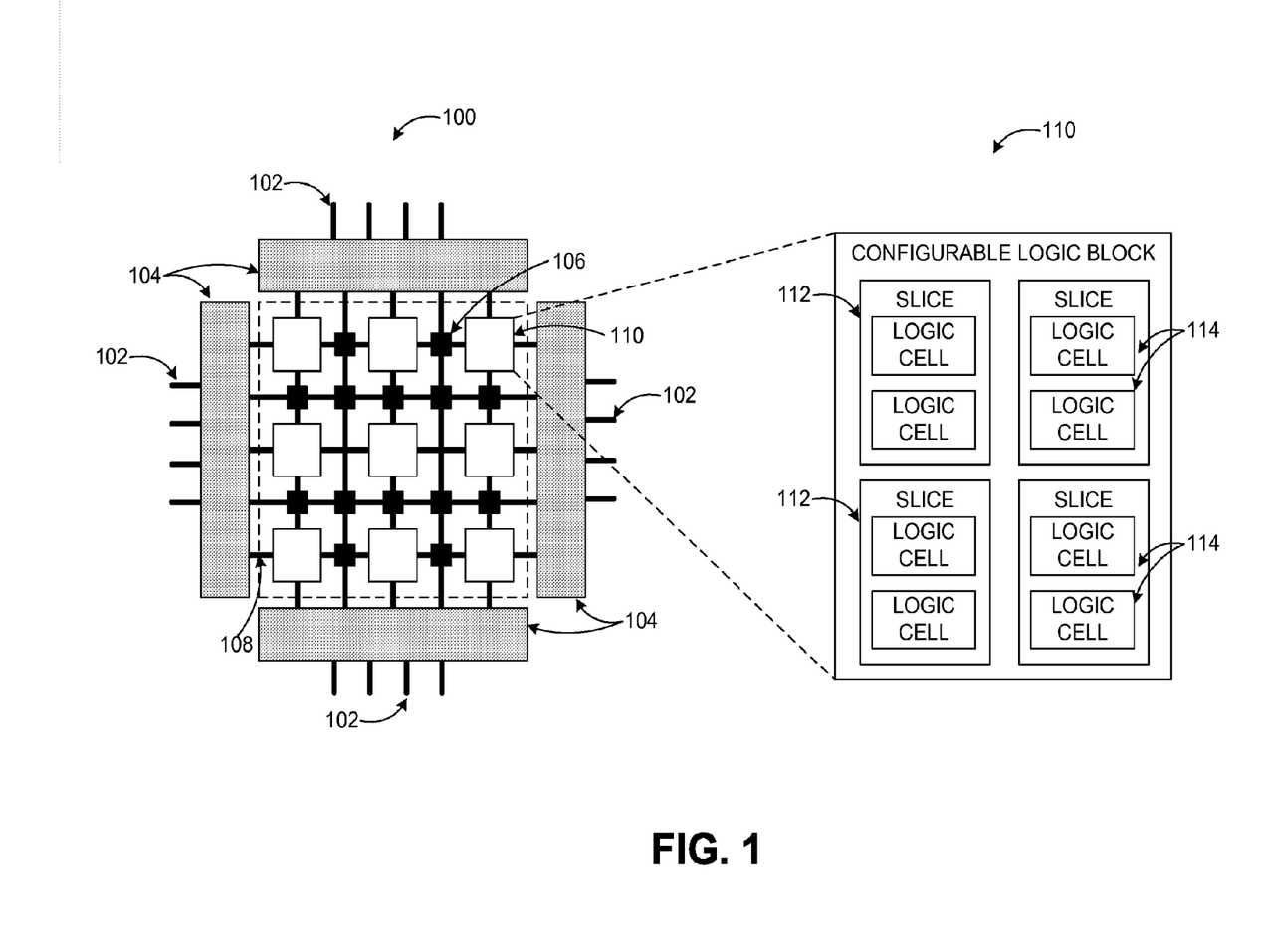
FIG. 1 illustrates a structure of an example Filed Programmable Gate Array, which may be employed as a service.

FIG. 1 illustrates a structure of an example Field Programmable Gate Array, which may be employed as a service, arranged in accordance with at least some embodiments described herein.

A field-programmable gate array (FPGA) 100 is an integrated circuit designed to be configured after manufacturing (field-programmable). FPGAs can be used to implement any logical function, and their configuration may be generally specified using a hardware description language (HDL).

FPGAs, such as the FPGA 100 depicted in FIG. 1, may include programmable logic components called configurable logic blocks 110, and a hierarchy of reconfigurable interconnects 106 that allow the blocks to be connected to logic gates in numerous different configurations. The configurable logic blocks 110 can be configured to perform complex combinational functions, or merely simple logic gates like AND and XOR. In some FPGAs, the configurable logic blocks 110 may include a number of slices 112 with each slice including one or more logic cells 114 (e.g., logic gates). Configurable logic blocks 110 may also include memory elements, which may be simple flip-flops or more complete blocks of memory.

The FPGA 100 may have digital and/or analog features. An example of analog features includes differential comparators on input pins 102 designed to be connected to differential signaling channels. Thus, the basic structure of an FPGA is array-based, where each integrated circuit comprises a two dimensional array of configurable logic blocks 110 that can be interconnected via horizontal and vertical routing channels. Input pins 102 may provide input to the logic blocks through input buffers 104 in a typical FPGA design.

Figure 2:
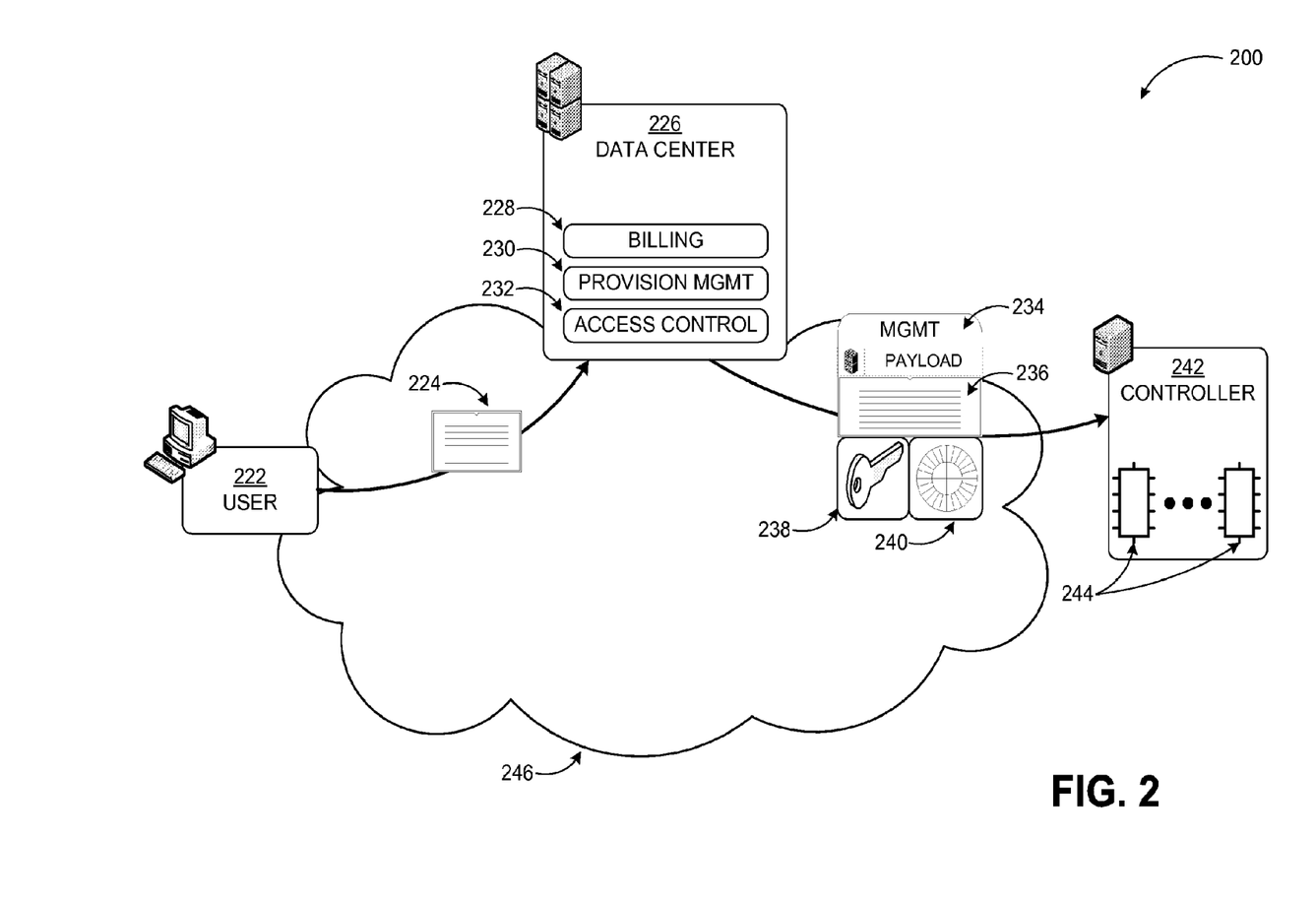
FIG. 2 illustrates conceptually a system for providing an integrated circuit (IC) as a service.

FIG. 2 illustrates conceptually a system for providing an integrated circuit (IC) as a service, arranged in accordance with at least some embodiments described herein.

A datacenter is a centralized repository for the storage, management, processing, and dissemination of data and information. A datacenter may exist within an organization's facilities or may be maintained as a specialized facility. Some datacenters may be synonymous with network operations centers (NOCs) containing automated systems that monitor server activity, web traffic, manage data, and network performance. Other datacenters may be specialized on managing collected data and providing data related services such as analysis or similar computations. While datacenters are typically associated with a physical entity (e.g., a server room, a server farm, etc.), datacenters may be configured as Virtual Datacenters (VDCs) as well, where managed data is compartmentalized based on size, owner, or other aspects through virtual servers and data stores.

A system according to some embodiments enables provisioning management for shared FPGA use as a service and access control to enable a user's processes to access their custom programmed FPGA by accepting user packages for compilation to an FPGA in communication with datacenter servers. A management payload may be added to the user package, and a driver and user key may be employed to allow selective and managed access to the FPGA as a service through datacenter virtual machines.

Referring to a diagram 200 of FIG. 2, a datacenter 226 may store data and provide services such as shared access to one or more FPGAs 244 for a multiple number of users (clients) such as a user 222. The user 222 may interact with the datacenter 226 over one or more networks 246 (e.g., cloud-based interaction). For the additional services such as billing tracking 228, provision management 230, and access control 232, the datacenter 226 may employ integrated or distinct applications or modules, which may be executed on individual servers or distributed over a number of servers.

Upon receiving a design package 224, for example, from the user 222, the datacenter 226 may add a management payload for identity, tracking, billing, and/or compatibility purposes to the user design package before compilation. A user key 238 may also be created matching the management payload 234 to enable the user 222 to launch a virtual machine and/or a paravirtualized driver that will communicate with a controller 242 managing the one or more FPGAs 244. Along with an FPGA design 236 and the management payload 234, the uploaded data may also include the user's custom hardware accelerator 240.

Figure 3:
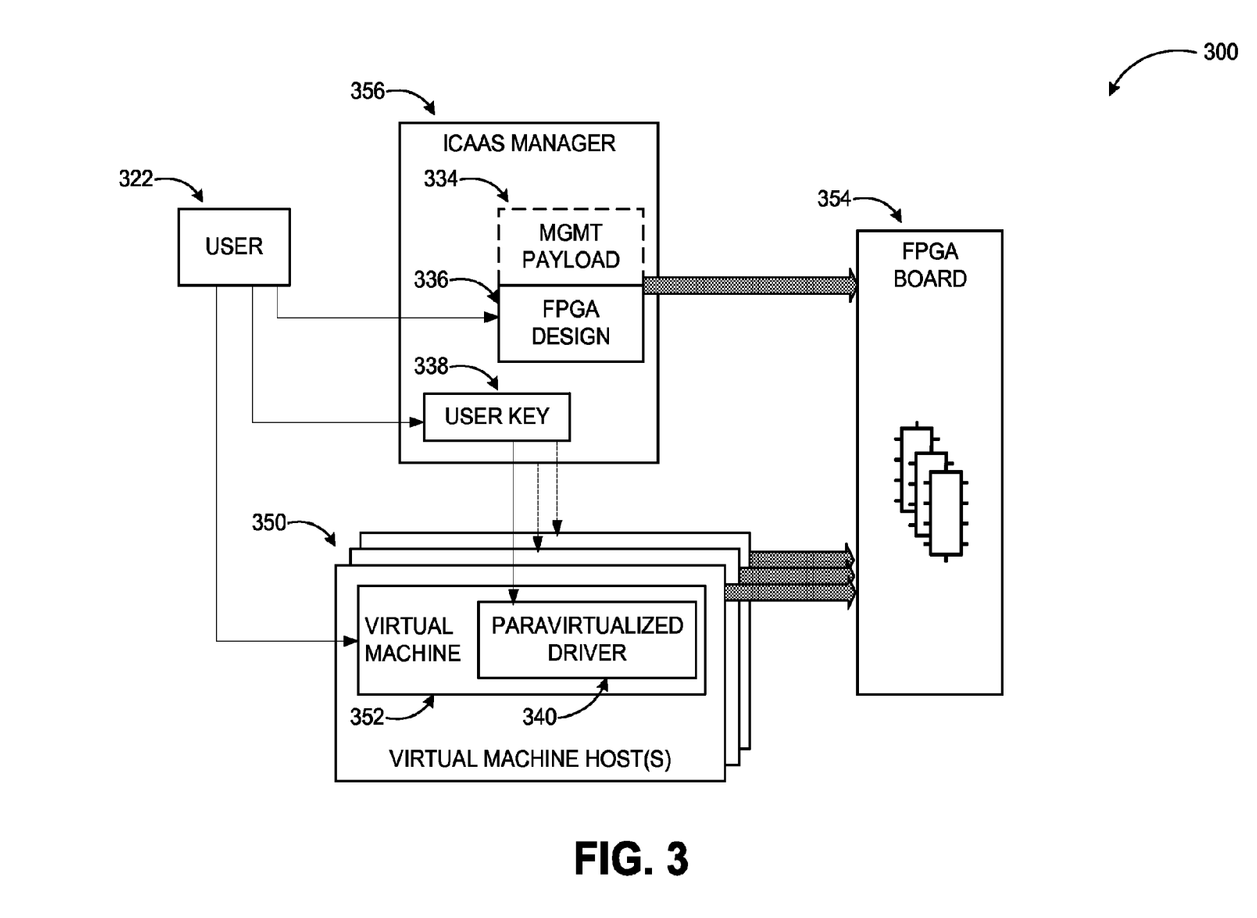
FIG. 3 illustrates interactions between major components of a system providing an IC as a service.

FIG. 3 illustrates interactions between major components of a system providing an IC as a service, arranged in accordance with at least some embodiments described herein.

According to an example scenario illustrated in a diagram 300 of FIG. 3, a user 322 may deliver an FPGA design 336 to an Integrated Circuit as a Service (ICaaS) manager 356. The ICaaS manager 356 may be one or more applications or a service of a datacenter effectively renting access to FPGAs to users. The ICaaS manager 356 may attach a management payload 334 to the FPGA design 336. The management payload 334 may manage the message interface to ensure user identity and track usage of the FPGA module using suitable metric(s) desired for billing and provisioning. For example, a combination of deployed time and consumed power may be used as a billing metric. The ICaaS manager 356 may also generate an ICaaS user key 338, which may be matched to the management payload 334. The user 322 may then be enabled to launch a virtual machine 352 of the datacenter with a paravirtualized driver 340 with a copy of the ICaaS user key 338 so that the user's virtual machines can communicate with an FPGA board 354 managing multiple FPGAs and use the user's custom uploaded hardware accelerator. The virtual machines and paravirtualized drivers, network connection, messaging, or other FPGA interconnection means may be hosted by virtual machine hosts 350 at the datacenter.

Imaging a payload into an FPGA involves a compilation step. In order to manage the ICaaS service the management payload 334 is added to the payload before compilation, effectively adding circuits that exist in the final design. Because the payload is added at the pre-compilation layer it may have broad access, but because of the gate-level nature of FPGA compilation, a properly designed management payload does not risk interfering with user design function as there is no program executable space to corrupt and no joint memory operations to disturb. The management payload may consume a fixed number of gates, which may be removed from the capacity available to the user 322.

In some examples, the management payload 334 may simply be a clock that records the time as soon as the overall payload is started after compilation. Such a clock may then report on elapsed time in response to an administrative message when the user terminates FPGA usage. In other examples, the management payload 334 may reside at the input/output I/O ports and ensure formats are followed and/or that access is performed using the ICaaS user key 338. By implementing the functionality in hardware, any potential delay on such a watchdog duty may be substantially avoided. In further examples, the management payload 334 may monitor a port for billing. For example, if the FPGA has direct access to a storage bus, the bus may be watched and activity tallied for billing.

The paravirtualized driver 340 may be employed to abstract hardware access into virtual machines. In a system according to some embodiments, the paravirtualized driver 340 may provide ownership verified access to a PCI bus, for example, connected to the FPGA board 354. In some embodiments, the FPGA board 354 may not be connected directly to the network for security purposes by requiring network access to be through directly connected virtual machines. In other embodiments, the FPGA board 354 may be connected directly to the network with suitable security measures. For example, datacenters may choose to allow direct access for trusted customers or certified payloads, or within hardware based virtual private datacenters where customers cannot impact others.

While embodiments have been discussed above using specific examples, components, and configurations in FIGS. 1 through 3, they are intended to provide a general guideline to be used for providing integrated circuits as a service. These examples do not constitute a limitation on the embodiments, which may be implemented using other components, modules, and configurations using the principles described herein. For example, access any suitable integrated circuit, not just FPGAs, may be provisioned as a service. According to other examples, the management payload may be implemented on a firewall between the FPGA(s) and the rest of the datacenter providing the access service. The firewall or any comparable component implementing the management payload may be realized as hardware, software, or a combination of the two. Furthermore, actions discussed above may be performed in various orders, especially in an interlaced fashion.

Figure 4:
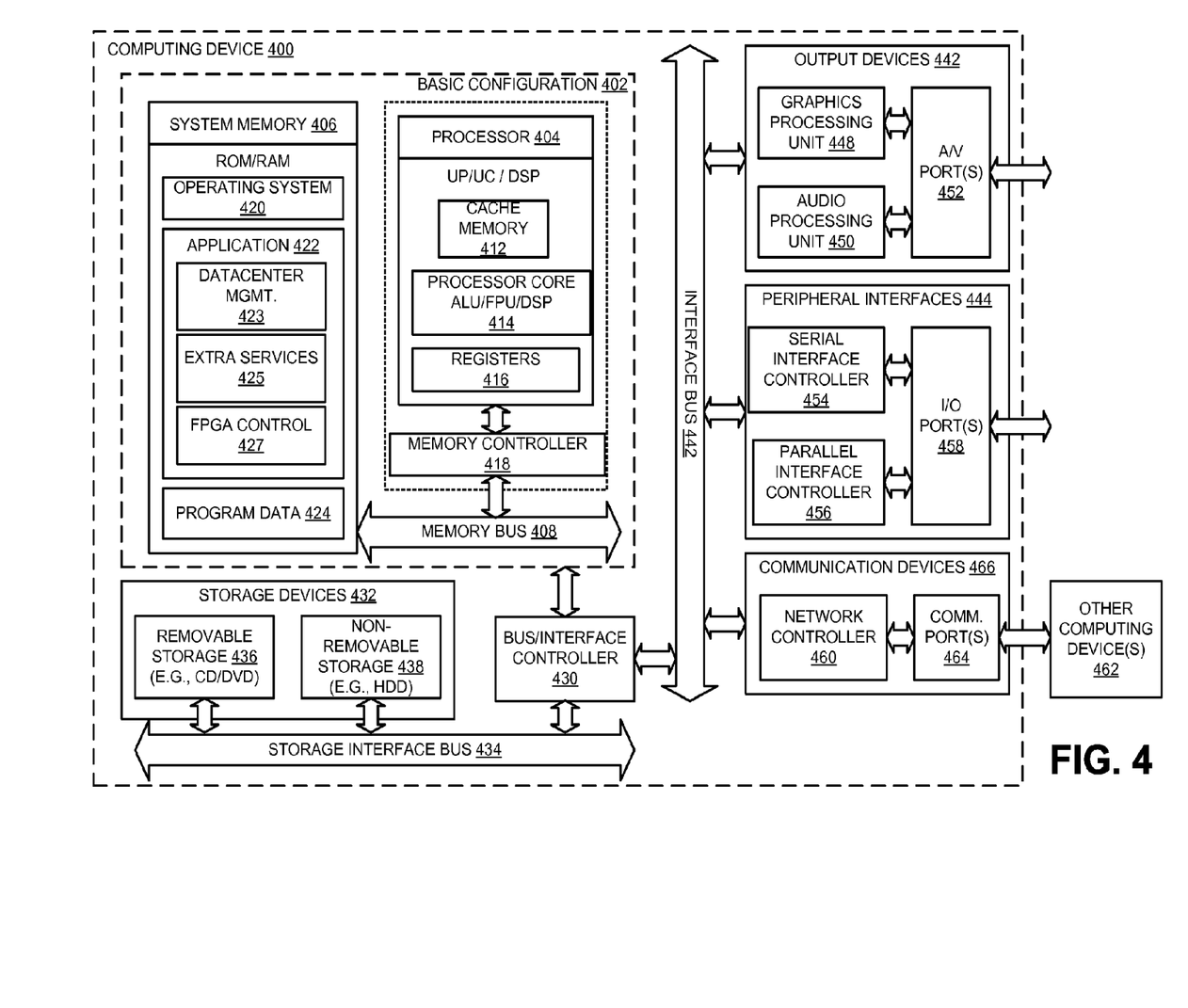
FIG. 4 illustrates a general purpose computing device, which may be used to manage a system providing an IC as a service.

FIG. 4 illustrates a general purpose computing device, which may be used to manage a system providing an IC as a service, arranged in accordance with at least some embodiments described herein. In a very basic configuration 402, a computing device 400 typically includes one or more processors 404 and a system memory 406. A memory bus 408 may be used for communicating between the processor 404 and the system memory 406.

Depending on the desired configuration, the processor 404 may be of any type including but not limited to a microprocessor (g), a microcontroller (μC), a digital signal processor (DSP), or any combination thereof The processor 404 may include one more levels of caching, such as a level cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof The system memory 406 may include an operating system 420, one or more applications 422, and program data 424. The applications 422 may include datacenter management module 423, extra services module 425, and FPGA control module 427, which may enable provisioning management for shared FPGA use and access control to enable a user's processes to access their custom programmed FPGA may accept user packages for compilation to an FPGA in communication with datacenter servers as described herein. The program data 424 may include, among other data, control parameters 428 associated with providing integrated circuit use as a service to clients. This described the basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via bus/interface controller 430. Some example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
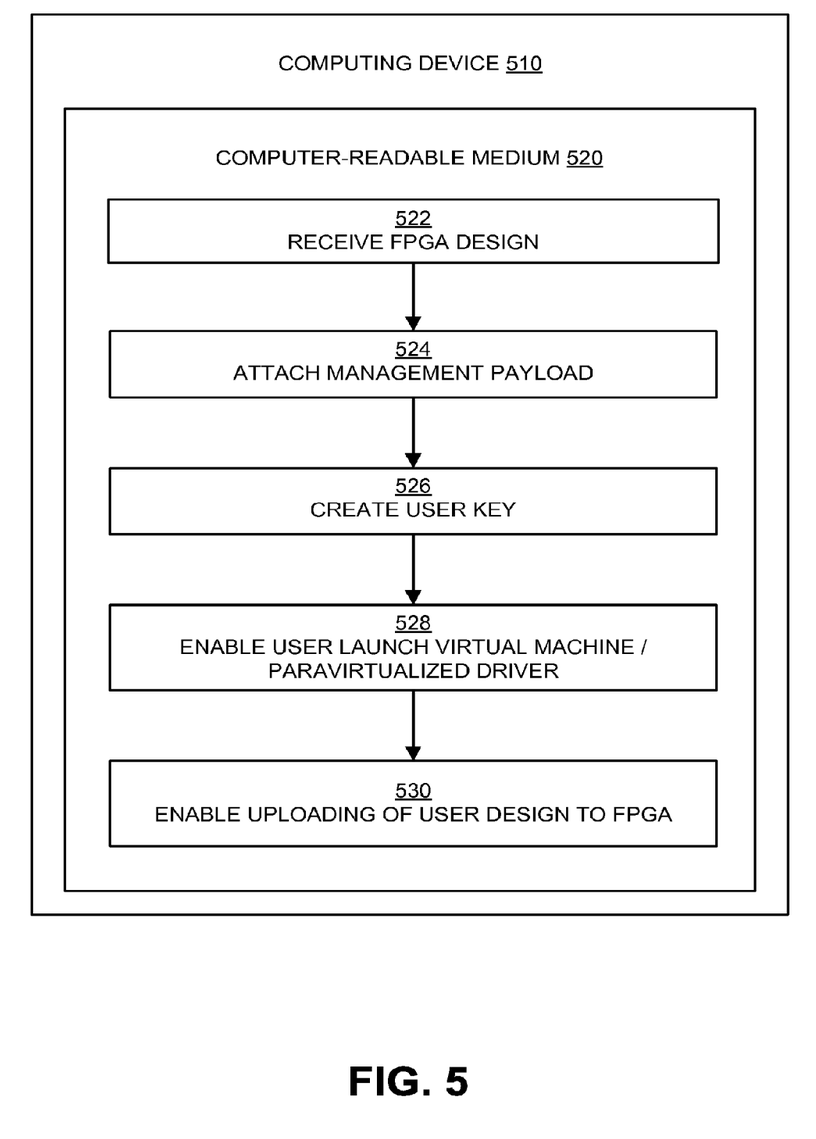
FIG. 5 is a flow diagram illustrating an example method for providing an IC as a service that may be performed by a computing device such as the device in FIG. 4.

FIG. 5 is a flow diagram illustrating an example method for providing an IC as a service that may be performed by a computing device such as the device in FIG. 4, arranged in accordance with at least some embodiments described herein. Example methods may include one or more operations, functions or actions as illustrated by one or more of blocks 522, 524, 526, 528, and/or 530. The operations described in blocks 522 through 530 may also be stored as computer-executable instructions in a computer-readable medium such as a computer-readable medium 520 of a computing device 510.

A process of or for providing access to an integrated circuit (FPGA) as a service may begin at block 522, "RECEIVE FPGA DESIGN". At block 522, a datacenter management server may receive an FPGA design package from a user such as the design package 224 from the user 222 of FIG. 2. The datacenter management server may further perform additional tasks such as authentication of the user 222, initialization of billing tracking, provision management among multiple users, etc.

Block 522 may be followed by block 524, "ATTACH MANAGEMENT PAYLOAD." At block 524, the management payload 234 of FIG. 2 may be added to the design package 224 prior to compilation to the FPGA. The management payload 234 may provide functionality needed for monitoring user access to the FPGA, billing tracking, and compatibility (e.g., making sure proper formats are followed). Block 524 may be followed by block 526, "CREATE USER KEY." At block 526, a user key such as the user key 238 of FIG. 2 may be created. The user key 238 may match the management payload 234 and enable the user to launch the virtual machine(s) for accessing the FPGA.

Block 526 may be followed by block 528, "ENABLE USER TO LAUNCH VIRTUAL MACHINE/PARAVIRTUALIZED DRIVER." At block 528, one or more virtual machines such as the virtual machine 352 and paravirtualized driver 340 of FIG. 3 may be launched with the user key to communicate the user's design to the FPGA. Paravirtualized driver 340 may be used to abstract hardware access into virtual machine 352. Block 528 may be followed by block 530, "ENABLE UPLOADING OF USER DESIGN TO FPGA." At block 530, the user's design package may be uploaded to the FPGA through the virtual machine and computation results returned to the user.

The functions performed at the blocks in the above described process are for illustration purposes. Providing integrated circuits as a service may be implemented by similar processes with fewer or additional functions. In some examples, the functions may be performed in a different order. In some other examples, various functions may be eliminated. In still other examples, various functions may be divided into additional functions, or combined together into fewer functions.

Figure 6:
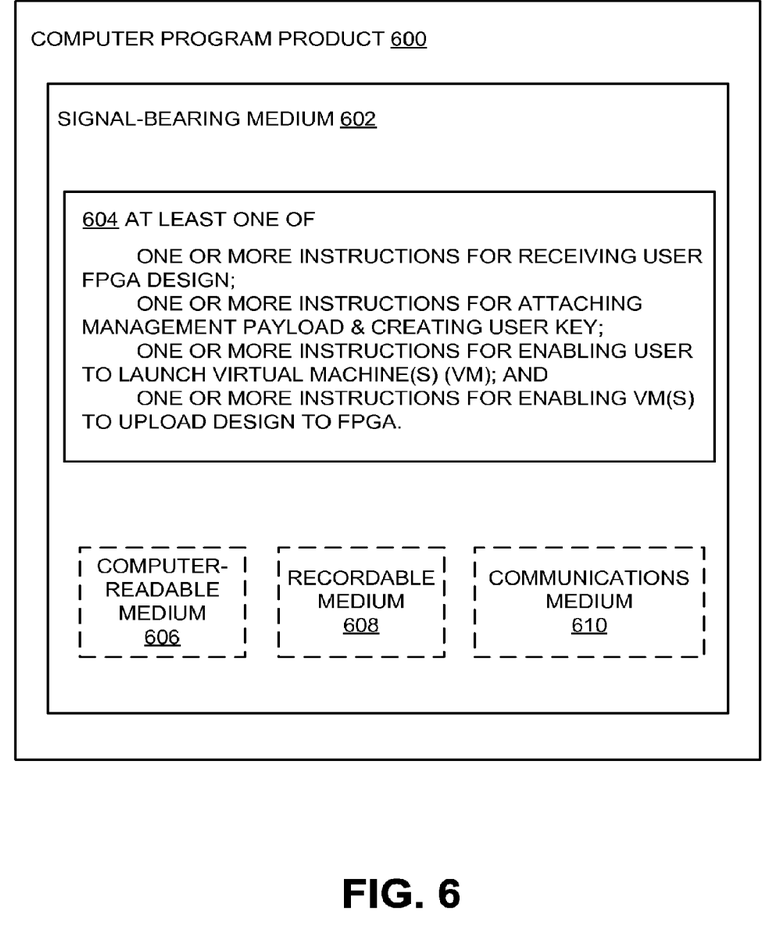
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, the computer program product 600 may include a signal bearing medium 602 that may also include machine readable instructions 604 that, when executed by, for example, a processor, may provide the functionality described above with respect to FIG. 4. Thus, for example, referring to the processor 404, datacenter management module 423, extra services module 425, and FPGA control module 427 may undertake one or more of the tasks shown in FIG. 6 in response to the instructions 604 conveyed to the processor 504 by the medium 602 to perform actions associated with receiving user FPGA design, attaching management payload and creating a user key, enabling user to launch virtual machines, and enabling the virtual machines to upload the design to an FPGA.

In some implementations, the signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, a method for providing a programmable integrated circuit (IC) as a service, may include receiving a programmable integrated circuit design package at a data center; adding a management payload to the IC design package; creating a user key associated with the IC design package, wherein the user key matches the management payload; and providing selective access to the programmable IC through one or more virtual machines employing the user key.

The programmable IC may be a Field Programmable Gate Array (FPGA), and the method may further include adding the management payload prior to compilation of the design package, where the compilation adds circuits for a final design. The method may also include connecting server functions from the data center to the FPGA through a messaging interface. The messaging interface may be a network or a Peripheral Computer Interconnect (PCI) interface. The method may also enable launching of one or more virtual machines with one or more paravirtualized drivers using a copy of the user key, where the paravirtualized drivers provide ownership verified access to the FPGA.

The method may further include providing at least one from a set of: a billing tracking service, a provisioning management service, and an access control service associated with execution of the received design package at the FPGA. Direct network access to the FPGA may be provided for one of: a trusted user, a user with a certified payload, and a user within a hardware based virtual private data center. The design package may be imaged to the FPGA with the added management payload. The management payload may manage a messaging interface for the FPGA to ensure user identity and tracks usage of the FPGA based on a predefined billing metric, where the billing metric may be based on one or more of deployed time and/or consumed power.

The one or more virtual machines may communicate with the FPGA using the user key and employ a custom hardware accelerator uploaded by a user associated with the IC design package. Furthermore, a manager processing the design package may consume a fixed number of gates, which may be removed from a capacity available to the user. In some examples, the management payload may be a clock that records time following starting compilation of an overall payload and report on elapsed time in response to an administrative message when the user terminates FPGA usage. In other examples, the management payload may reside at I/O ports and ensure formats are followed and/or access control is performed using the user key. The management payload may also ensure that a port is watched and connection activities are tallied for billing.

According to other examples, a data center providing a programmable integrated circuit (IC) as a service may include a management server, which may receive a programmable integrated circuit design package at a data center; add a management payload to the IC design package; create a user key associated with the IC design package, wherein the user key matches the management payload; and provide selective access to the programmable IC through one or more virtual machines employing the user key.

The programmable IC may be a Field Programmable Gate Array (FPGA), and the management server may further add the management payload prior to compilation of the design package, where the compilation adds circuits for a final design. The management server may also connect server functions from the data center to the FPGA through a messaging interface. The messaging interface may be a network or a Peripheral Computer Interconnect (PCI) interface. The management server may also enable launching of one or more virtual machines with one or more paravirtualized drivers using a copy of the user key, where the paravirtualized drivers provide ownership verified access to the FPGA.

The management server may further provide at least one from a set of: a billing tracking service, a provisioning management service, and an access control service associated with execution of the received design package at the FPGA. Direct network access to the FPGA may be provided for one of: a trusted user, a user with a certified payload, and a user within a hardware based virtual private data center. The design package may be imaged to the FPGA with the added management payload. The management payload may manage a messaging interface for the FPGA to ensure user identity and tracks usage of the FPGA based on a predefined billing metric, where the billing metric may be based on one or more of deployed time and/or consumed power.

The one or more virtual machines may communicate with the FPGA using the user key and employ a custom hardware accelerator uploaded by a user associated with the IC design package. Furthermore, a manager processing the design package may consume a fixed number of gates, which may be removed from a capacity available to the user. In some examples, the management payload may be a clock that records time following starting compilation of an overall payload and report on elapsed time in response to an administrative message when the user terminates FPGA usage. In other examples, the management payload may reside at I/O ports and ensure formats are followed and/or access control is performed using the user key. The management payload may also ensure that a port is watched and connection activities are tallied for billing.

According to further examples, a computer-readable storage medium may include instructions stored thereon for providing a programmable integrated circuit (IC) as a service. The instructions may include receiving a programmable integrated circuit design package at a data center; adding a management payload to the IC design package; creating a user key associated with the IC design package, wherein the user key matches the management payload; and providing selective access to the programmable IC through one or more virtual machines employing the user key.

The programmable IC may be a Field Programmable Gate Array (FPGA), and the instructions may further include adding the management payload prior to compilation of the design package, where the compilation adds circuits for a final design. The instructions may also include connecting server functions from the data center to the FPGA through a messaging interface. The messaging interface may be a network or a Peripheral Computer Interconnect (PCI) interface. The instructions may also include enabling launching of one or more virtual machines with one or more paravirtualized drivers using a copy of the user key, where the paravirtualized drivers provide ownership verified access to the FPGA.

The instructions may further include providing at least one from a set of: a billing tracking service, a provisioning management service, and an access control service associated with execution of the received design package at the FPGA. Communication access to the FPGA may be provided for one of: a trusted user, a user with a certified payload, and a user within a hardware based virtual private data center. The design package may be imaged to the FPGA with the added management payload. The management payload may manage a messaging interface for the FPGA to ensure user identity and tracks usage of the FPGA based on a predefined billing metric, where the billing metric may be based on one or more of deployed time and/or consumed power.

The one or more virtual machines may communicate with the FPGA using the user key and employ a custom hardware accelerator uploaded by a user associated with the IC design package. Furthermore, a manager processing the design package may consume a fixed number of gates, which may be removed from a capacity available to the user. In some examples, the management payload may be a clock that records time following starting compilation of an overall payload and report on elapsed time in response to an administrative message when the user terminates FPGA usage. In other examples, the management payload may reside at I/O ports and ensure formats are followed and/or access control is performed using the user key. The management payload may also ensure that a port is watched and connection activities are tallied for billing.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing a programmable integrated circuit (IC) as a service, the method comprising:
   receiving a programmable IC design package at a data center; adding a management payload to the IC design package;
   creating a user key associated with the IC design package, wherein the user key matches the management payload;
   providing selective access to the programmable IC through one or more virtual machines of the data center by employing the user key, wherein the one or more virtual machines communicate with the programmable IC using the user key and employ a custom hardware accelerator uploaded by a user associated with the IC design package;
   enabling a launch of the one or more virtual machines, wherein the one or more virtual machines communicate with the programmable IC through a controller managing the programmable IC;
   executing the IC design package at the programmable IC;
   providing at least one of a billing tracking service and a provisioning management service associated with execution of the IC design package at the programmable IC; and
   tracking a usage of the programmable IC based on a billing metric which includes a deployed time and a consumed power.

2. The method according to claim 1, wherein the programmable IC is a Field Programmable Gate Array (FPGA).

3. The method according to claim 2, further comprising:
   adding the management payload prior to compilation of the design package, wherein the compilation adds circuits for a final design.

4. The method according to claim 2, further comprising:
   connecting server functions from the data center to the FPGA through a messaging interface.

5. The method according to claim 4, wherein the messaging interface employs one of a network and a Peripheral Computer Interconnect (PCI) interface.

6. The method according to claim 2, further comprising:
   enabling launching of one or more virtual machines with one or more paravirtualized drivers using a copy of the user key, wherein the paravirtualized drivers provide ownership verified access to the FPGA.

7. The method according to claim 2, wherein the design package is imaged to the FPGA with the added management payload.

8. The method according to claim 7, wherein the management payload manages a messaging interface for the FPGA to ensure user identity and tracks usage of the FPGA based on a predefined billing metric.

9. A computing device providing a programmable integrated circuit (IC) as a service, the computing device comprising:
   a memory;
   a processor coupled to the memory, the processor configured to execute an application, the application configured to:
   receive a programmable IC design package at a data center;
   add a management payload to the IC design package;
   create a user key associated with the IC design package, wherein the user key matches the management payload;
   provide selective access to the programmable IC through one or more virtual machines of the data center by employing the user key, wherein the one or more virtual machines communicate with the programmable IC using the user key and employ a custom hardware accelerator uploaded by a user associated with the IC design package;
   enable a launch of the one or more virtual machines, wherein the one or more virtual machines communicate with the programmable IC through a controller managing the programmable IC;
   execute the IC design package at the programmable IC;
   provide at least one of a billing tracking service and a provisioning management service associated with execution of the IC design package at the programmable IC; and track a usage of the programmable IC based on a billing metric which includes a deployed time and a consumed power.

10. The computing device according to claim 9, wherein the programmable IC is a Field Programmable Gate Array (FPGA).

11. The computing device according to claim 10, wherein the application is further configured to:
enable direct network access to the FPGA for at least one of a trusted user, a user with a certified payload, and a user within a hardware based virtual private data center.

12. The computing device according to claim 10, wherein the IC design package is imaged to the FPGA with the added management payload.

13. The computing device according to claim 12, wherein the management payload manages a messaging interface for the FPGA to ensure user identity.

14. The computing device according to claim 10, wherein a manager processing the IC design package consumes a fixed number of gates, which are removed from a capacity available to the user.

15. A computer-readable memory device having instructions stored thereon for providing Field Programmable Gate Array (FPGA) as a service, the instructions comprising:
receiving a programmable integrated circuit (IC) design package at a data center;
adding a management payload to the IC design package;
creating a user key associated with the IC design package, wherein the user key matches the management payload;
providing selective access to the FPGA through one or more virtual machines of the data center by employing the user key, wherein the one or more virtual machines communicate with the FPGA using the user key and employ a custom hardware accelerator uploaded by a user associated with the IC design package;
enabling a launch of the one or more virtual machines, wherein the one or more virtual machines communicate with the FPGA through a controller managing the FPGA;
executing the IC design package at the FPGA;
providing at least one of a billing tracking service and a provisioning management service associated with execution of the IC design package at the FPGA; and
tracking a usage of the FPGA based on a billing metric which includes a deployed time and a consumed power.

16. The computer-readable memory device according to claim 15, wherein the management payload is a clock that records time following starting compilation of an overall payload and reports on elapsed time in response to an administrative message when the user terminates FPGA usage.

17. The computer-readable memory device according to claim 15, wherein the management payload resides at input/output ports and ensures formats are followed and access control is performed using the user key.

18. The computer-readable memory device according to claim 15, wherein the management payload ensures that a port is watched and connection activities are tallied for billing.

* * * * *

UNITED STATES PATENT AND TRADEMARK OFFICE
CERTIFICATE OF CORRECTION

| | | |
|---|---|---|
| PATENT NO. | : 8,635,675 B2 | Page 1 of 1 |
| APPLICATION NO. | : 13/521440 | |
| DATED | : January 21, 2014 | |
| INVENTOR(S) | : Kruglick | |

It is certified that error appears in the above-identified patent and that said Letters Patent is hereby corrected as shown below:

On the Title Page

On Page 2, Item (56), under "OTHER PUBLICATIONS", in Column 2, Line 16, delete "Performanc" and insert -- Performance --, therefor.

In the Specifications

In Column 2, Line 23, delete "Filed" and insert -- Field --, therefor.

In Column 2, Line 42, delete "hereof" and insert -- hereof. --, therefor.

In Column 5, Line 43, delete "(g)," and insert -- ($\mu$P), --, therefor.

In Column 5, Line 44, delete "thereof" and insert -- thereof. --, therefor.

In Column 5, Line 56, delete "thereof" and insert -- thereof. --, therefor.

In Column 6, Line 12, delete "thereof" and insert -- thereof. --, therefor.

In Column 11, Line 13, delete "thereof" and insert -- thereof. --, therefor.

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,635,675 B2 |
| APPLICATION NO. | : 13/521440 |
| DATED | : January 21, 2014 |
| INVENTOR(S) | : Ezekiel Kruglick |

It is certified that error appears in the above-identified patent and that said Letters Patent is hereby corrected as shown below:

In the Drawings

Delete Drawing Sheet 4 of 11, and replace with Drawing Sheet 4. (Attached)

FIG. 4.

Delete numeral reference "442" of the interface bus and insert --440--.

Signed and Sealed this
Ninth Day of September, 2014

Michelle K. Lee
*Deputy Director of the United States Patent and Trademark Office*

FIG. 4